United States Patent [19]
Emi et al.

[11] Patent Number: 5,849,189
[45] Date of Patent: Dec. 15, 1998

[54] HOLLOW FIBER BLOOD PURIFYING MEMBRANE AND PROCESS FOR ITS PRODUCTION

[75] Inventors: Shingo Emi; Kouji Soga; Satoshi Fukuhara, all of Iwakuni, Japan

[73] Assignee: Teijin Limited, Osaka, Japan

[21] Appl. No.: 549,692

[22] PCT Filed: Mar. 2, 1995

[86] PCT No.: PCT/JP95/00339

§ 371 Date: Nov. 6, 1995

§ 102(e) Date: Nov. 6, 1995

[87] PCT Pub. No.: WO95/24262

PCT Pub. Date: Sep. 14, 1995

[30] Foreign Application Priority Data

Mar. 8, 1994 [JP] Japan ...................................... 6-62144
Mar. 8, 1994 [JP] Japan ...................................... 6-62145

[51] Int. Cl.$^6$ .................................................. B01D 63/00
[52] U.S. Cl. ................. 210/500.3; 210/490; 210/500.23; 210/500.29; 210/500.32; 264/199; 264/200
[58] Field of Search ........................... 210/500.29, 500.3, 210/500.31, 500.32, 500.23, 490; 264/199, 200

[56] References Cited

U.S. PATENT DOCUMENTS

| | | |
|---|---|---|
| 3,745,202 | 7/1973 | Riggleman et al. ................. 210/500.3 |
| 4,276,173 | 6/1981 | Kell et al. ................................ 264/200 |
| 4,342,711 | 8/1982 | Joh et al. .................................. 264/41 |
| 4,543,221 | 9/1985 | Chen et al. ......................... 210/500.31 |
| 4,681,713 | 7/1987 | Miyagi et al. ........................ 210/500.3 |
| 4,857,196 | 8/1989 | Manabe et al. ...................... 210/500.3 |
| 4,886,631 | 12/1989 | Suzuki et al. ............................. 264/48 |
| 4,980,063 | 12/1996 | Mahoney et al. .................. 210/500.31 |
| 5,063,009 | 11/1991 | Mizutani et al. .................. 210/500.29 |
| 5,505,890 | 4/1996 | Düweg et al. ..................... 210/500.23 |
| 5,624,561 | 4/1997 | Unishi et al. ...................... 210/500.32 |

FOREIGN PATENT DOCUMENTS 0570826  11/1993  Germany .

*Primary Examiner*—Ana Fortuna
*Attorney, Agent, or Firm*—Burgess, Ryan & Wayne

[57] ABSTRACT

A hollow fiber blood purifying membrane which is a hollow fiber membrane substantially composed of cellulose acetate, has a substantially non-oriented distribution of cellulose acetate polymer particles on the inner surface of the hollow fibers, has a dense layer with a thickness in the range of 30–1000 nm on both the inner and outer surface of the hollow fibers and a porous structure which is substantially uniform at the membrane wall between the two dense layers, and has an in vitro ultrafiltration rate (UFR) of 10 to 50 ml/m$^2$·mmHg·hr and a (in vivo UFR)/(in vitro UFR) ratio of at least 0.3, a blood plasma albumin permeation blockage of at least 90%, and an in vivo $\beta_2$-microglobulin ($\beta_2$-MG) sieving coefficient of at least 0.4, as well as a process for its production.

13 Claims, 8 Drawing Sheets

HOLLOW FIBER BLOOD PURIFYING MEMBRANE AND PROCESS FOR ITS PRODUCTION

TECHNICAL FIELD

The present invention relates to a hollow fiber blood purifying membrane, and particularly to a blood purifying membrane made of high-performance hollow cellulose acetate fibers having a specific internal/external surface ratio and cross-section condition, and having a specific selective permeability. More specifically, the present invention provides a blood purifying membrane made of hollow fibers composed of a cellulose acetate polymer with a high degree of polymerization, which excels at removing middle to high molecular proteins of molecular weight 10,000 to 20,000, such as $\beta_2$-microglobulin ($\beta_2$-MG), has excellent blood plasma albumin permeation blockage, has a small difference in in vivo and in vitro ultrafiltration rate (UFR) values, undergoes little change in performance with time, and is excellently suited for living organisms. The present invention also provides a process for the production of such a blood purifying membrane.

BACKGROUND ART

Selectively permeable hollow fibers have been used in common practice for blood dialysis. The blood purifying apparatuses used for blood dialysis comprise a plurality of dialysis membranes, for example hollow fiber membranes, arranged in parallel in a cage-like housing, and the patient's blood is allowed to flow through the inner hollow while the dialyzing fluid is allowed to flow on the outside, i.e. between the hollow fibers, for dialysis through the hollow fiber membranes to remove waste products from the blood and rectify electrolyte concentrations, with ultrafiltration carried out due to the differential pressure between the inside and outside of the hollow fibers, to remove excess water from the blood.

The hollow fibers for blood processing must be selectively permeable to specific substances, depending on the purpose. Their performance is determined based on the material of the hollow fibers as well as the porosity (size and number of pores, etc.) and membrane thickness.

Cellulose and cellulose acetate are two materials commonly used in hollow fibers for blood purifiers. In particular, cellulose acetate fibers are relatively easy to produce by commonly used spinning methods such as plasticizing melt spinning or wet spinning, and when the resultant hollow fibers are used for blood dialysis therapy, they provide the advantage of allowing some degree of suppression of complement activity in contrast to, for example, hollow cellulose fibers.

Conventional blood purification membranes made of cellulose acetate, however, even with pore sizes large enough to allow removal of $\beta_2$-MG, have become clogged by adsorption of proteins, etc. during the dialysis procedure, leading to deterioration with time accompanied by a marked decrease in the ultrafiltration rate, whereas membranes which are too dense have lacked the ability to remove middle to high molecular weight proteins such as $\beta_2$-MG.

On the other hand, hollow fibers produced by melt spinning cellulose acetate are disclosed in Japanese Unexamined Patent Publication No. 54-42420 which describes a process for obtaining a dialysis membrane by adding a homogeneous mixture of polyethylene glycol and glycerine to a cellulose ester to produce hollow fibers and then extracting the mixture. The membrane obtained by this process, however, is limited to permeability to low molecular weight substances, and being a dense membrane it is vastly different from the membrane obtained by the production process of the present invention.

In Japanese Examined Patent Publication No. 3-62447, some of the present inventors have proposed a process by which hollow fibers are made from a composition prepared by mixing a cellulose ester with given proportions of a water-soluble polyhydric alcohol and an additive selected from the group consisting of polyethers one of whose residues is glycerin, which substantially has no plasticizing effect on the cellulose ester and is compatible with the polyhydric alcohol, after which the additive is removed by extraction. For this purpose there is indicated a process for forming a microphase separation during melt spinning of the cellulose acetate, i.e. a process for producing a membrane by combination of the specific water-soluble polyhydric alcohol and the polyether one of whose residues is glycerin. This constituted a considerable improvement over conventional processes for producing a porous structure in hollow cellulose acetate fibers by melt spinning.

DISCLOSURE OF THE INVENTION

The present inventors have conducted diligent research with the aim of providing a hollow cellulose acetate fiber blood purifying membrane with low deterioration over time and excellent ability to remove middle to high molecular proteins such as $\beta_2$-MG, features not provided by conventional blood purifying membranes employing cellulose acetate, and which is also excellently suited for purifying blood.

The present inventors have completed the present invention on the basis of the finding that a blood purifying membrane with the desired properties can be provided by a hollow cellulose acetate fiber membrane of which the inner surface of the hollow portion is substantially flat and the arrangement of the cellulose acetate polymer particles on the inner surface is substantially non-oriented, which has a thin dense layer with a thickness in the range of 30 to 1000 nm on both the innermost and outermost portion of the membrane as viewed by a cross-section of the hollow fibers, and which has a porous structure which is substantially uniform from the inside to the outside of the membrane.

In other words, the present invention provides a hollow fiber blood purifying membrane characterized by being a hollow fiber membrane substantially composed of cellulose acetate, by having a substantially non-oriented distribution of cellulose acetate polymer particles on the inner surface of the hollow fibers, having a thin dense layer with a thickness in the range of 30 to 1000 nm on both the inner and outer surface of the hollow fibers and a porous structure which is substantially uniform at the membrane wall between the two dense layers, and by having an in vitro ultrafiltration rate (UFR) of 10 to 50 ml/m$^2$·mmHg·hr and a ratio of (in vivo UFR)/(in vitro UFR) of at least 0.3, a blood plasma albumin permeation blockage of at least 90%, and an in vivo $\beta_2$-microglobulin ($\beta_2$-MG) sieving coefficient of at least 0.4.

The present invention encompasses a hollow fiber blood purifying membrane the inner surface of the hollow fibers of which is substantially flat, a hollow fiber blood purifying membrane the in vitro UFR of which is between 15 and 35 ml/m$^2$·mmHg·hr, and a hollow fiber blood purifying membrane the blood plasma albumin permeation blockage of which is at least 93%. The present invention also encompasses a hollow fiber blood purifying membrane the cellulose acetate acetylation degree of which is 50–58% and the cellulose acetate polymerization degree of which is 160 to 400.

BEST MODE FOR CARRYING OUT THE INVENTION

The hollow cellulose acetate fibers to be used according to the present invention substantially are composed mainly of cellulose acetate polymer. Here, the cellulose acetate polymer refers to a polymer wherein the —OH radicals of the cellulose have been acetylated to some degree, and preferred specific examples are cellulose diacetate and cellulose triacetate. Particularly preferred of these are cellulose acetates with acetylation degrees in the range of 50–58%, preferably 52–57% and more preferably 53–56%. With an acetylation degree of less than 50%, it is sometimes difficult to obtain many pores of large-sized radius. An acetylation degree exceeding 58% tends to result in clogging by absorption of proteins, etc. in the blood during processing of the blood. Here, the acetylation degree refers to the amount of bonded acetic acid (in percentage by weight) in the sample (polymer), and it is intended to mean the average acetylation degree.

According to the present invention, the thickness of the dense layer on the inner surface and outer surface is preferably 30 to 100 nm, the in-vitro UFR is preferably 15–35 ml/m²·mmHg·hr, the (in-vivo UFR)/(in-vitro UFR) value is preferably 0.35 or greater and more preferably 0.40 or greater, the blood plasma albumin permeation blockage is preferably at least 93%, and the in-vivo $\beta_2$-MG sieving coefficient is preferably 0.45 or greater.

The cellulose acetate polymer to be used according to the present invention preferably has an average polymerization degree of 160 to 400, and particularly 200 to 300. Here, the average polymerization degree is intended to mean the value of the weight average molecular weight of the polymer divided by the molecular weight of the repeating unit of the polymer. Methods of measuring weight average molecular weight include, for example, gel permeation chromatography, viscosity measurement, sedimentation equilibrium measurement and light scattering methods.

With an average polymerization degree of less than 160, it is difficult to lower the polymer concentration of the dope when making fibers, and especially when making fibers by melt spinning, while there are also problems in obtaining a membrane with a pore radius suitable for removing $\beta_2$-MG and the containment strength of the pores is reduced. Conversely, when it is greater than 400 the production of the polymer itself becomes more difficult, while high temperatures are needed for melt spinning and the cellulose acetate tends to easily decompose.

Furthermore, the inner diameter of the hollow fibers is preferably between 100 and 300 $\mu$m, and more preferably between 150 and 250 $\mu$m. The membrane thickness is 20 $\mu$m or less, and preferably between 10 and 16 $\mu$m, when moist.

The hollow cellulose acetate fibers may have fins on the outer periphery extending in the direction of their length, in which case the ratio of H/W, where H is the height and W is the width, is preferably 0.5 or greater. This ratio H/W is preferably not less than 0.5 since it then becomes difficult to achieve the effect of preventing cohesion between the hollow fibers when they are kept in the blood purifying apparatus. The ratio H/W is more preferably 0.8 or greater. Here, the width W of the fins is intended to mean the width ($\mu$m) at the midpoint along the height H of the fins.

The number x of fins on the hollow fibers should be at least one, but if this number is 11 or more there is a notable decrease in the effective membrane area due to the base of the fins, and since this considerably impairs the performance in terms of substance dialysis and water permeation of the blood purifying apparatus, it is not practical. Generally, then, x is preferably 1–10 and more preferably 2–8, with a particularly effective range being 3–7.

The height H of the fins is preferably 5 to 100 $\mu$m, and particularly 9 to 60 $\mu$m. Also, the ratio H/h of the fin height H ($\mu$m) and the membrane thickness h ($\mu$m) is preferably 0.5 to 3, and particularly 1 to 2. In addition, the ratio H/d of the average fin height H ($\mu$m) and the average diameter d ($\mu$m) of the hollow fibers without the fins is preferably 0.01 to 1 and more preferably 0.02 to 0.5, with a range of 0.03 to 0.2 being particularly preferred.

Although it is preferred that the width at the base of the fins be narrower than at the top of fins, in most cases the bases tend to be wider due to surface tension of the spinning stock solution after it has been discharged from the nozzle. It is suitable in such cases for the width of the bases to be between 15 and 50 $\mu$m, and preferably between 20 and 40 $\mu$m.

Hollow fibers with fins described by the ranges given above have good conicity, and are preferred for avoiding blood coagulation and residues inside the hollow fibers.

The hollow fibers used preferably have a remoistened elongation rate of 3% or lower. A remoistened elongation rate of greater than 3% is not preferred since the hollow fibers stretch too much when moistened by being filled with physiological saline or the like after being housed in a blood purifying apparatus in a substantially dry state, there is increased local cohesion between the hollow fibers, and bending of the hollow fibers occurs. The remoistened elongation rate is more preferably 2.5% or lower. There is no particular minimum limit for the remoistened elongation rate.

The remoistened elongation rate a may be calculated by the equation $\alpha=\{(L_1-L)/L\}\times 100$, where L is the length of the substantially dry hollow fibers under a load of about 0.1 g/de, and $L_1$ is the length of the water-moistened fibers when measured under a load of about 0.01 g/de. Here, "substantially dry" means a state in which the glycerin content is 30–60% and the water content is 0.5–9%, obtained upon drying the hollow fibers after they are immersed in an aqueous glycerin solution.

The hollow fibers to be used according to the present invention preferably have a substantial flexural rigidity in the range of 200 mg/200 fibers or greater, and the pressure resistance when pressure is applied to the inside of the moistened hollow fibers is preferably a bursting pressure of at least 4 kg/cm². This provides various advantages, in that hollow fibers within this range are easy to manage during production of blood purifying apparatuses, their lengths tend to be more uniform in blood purifying apparatuses, and they are less prone to damage by pressure exerted during use of the blood purifying apparatuses.

A hollow fiber blood purifying membrane according to the present invention not only has excellent ability to remove middle to high molecular proteins such as $\beta_2$-MG, but also satisfactorily removes lower molecules such as urea. The overall mass transfer coefficient for urea is 0.040 cm/min or greater, preferably 0.042 cm/min or greater, and more preferably 0.047 cm/min or greater. Here, the overall mass transfer coefficient ($K_0$) is the value obtained by the following formula, and it is a parameter expressing the ease with which solutes pass through the blood purifying apparatus.

$$K_0 = \frac{Q_B \ln \frac{1 - C_L/Q_D}{1 - C_L/Q_B}}{A(1 - Z)}$$

Here, $Q_B$ is the blood flow (ml/min), $Q_D$ is the dialysate flow (ml/min), A is the membrane area (cm²), Z is $Q_B/Q_D$, and $C_L$ is the clearance. The clearance refers to the blood flow when the solute concentration is 0, and it is calculated by the following formula.

$$C_L = \frac{C_{Bi} \times Q_{Bi} - C_{Bo} \times Q_{Bo}}{C_{Bi}}$$

Here, $C_{Bi}$ is the solute concentration at the blood inlet point, $Q_{Bi}$ is the flow at the blood inlet point, $C_{Bo}$ is the solute concentration at the blood outlet point and $Q_o$ is the flow at the blood outlet point.

The type of hollow fibers described above which are useful for the present invention may be produced by any publicly known process including melt spinning, wet spinning, semi-dry/semi-wet spinning, etc. For example in the case of melt spinning, the spinning stock used is a heated melt solution of the cellulose acetate polymer containing an additive, and this is discharged from a spinning nozzle and cooled to hardness to form hollow fibers, after which a solvent which dissolves the additive but not the cellulose acetate polymer is used to remove at least part of the additive in the hollow fibers by extraction, making it possible to obtain hollow cellulose acetate fibers with selective permeability.

Thus, a hollow fiber blood purifying membrane according to the present invention may be produced by the following process, for example. That is, a mixture is prepared containing, with respect to 100 parts by weight of a cellulose acetate polymer, at least one type of water-soluble polyhydric alcohol with a thermoplasticizing effect on the cellulose acetate polymer and a solubility parameter of less than 10 (X parts by weight), at least one type of water-soluble polyether with a solubility parameter exceeding 14 and at least one residue comprising glycerin (Y parts by weight), and at least one type of water-soluble polyhydric alcohol with a solubility parameter in the range of 10 to 14 (Z parts by weight), in the ranges specified by the following inequalities (i)–(iii), $120 \leq X+Y+Z \leq 250$        (i)

$10 \leq Y \leq 100$        (ii)

$3 \leq Z \leq 50$        (iii)

and after this mixture is melt spun into hollow fibers, the obtained hollow fibers are subjected to extraction with a heated aqueous medium, and at least one type of either a polyether with at least one residue comprising glycerin or a polyhydric alcohol, which is water-soluble and harmless and has a solubility parameter exceeding 14, is attached thereto.

The water-soluble polyhydric alcohol with a thermoplasticizing effect on the cellulose acetate polymer and a solubility parameter of less than 10 may be a water-soluble polyhydric alcohol such as, for example, polyethylene glycol or polypropylene glycol, with a molecular weight of 200 or greater, and polyethylene glycol with a molecular weight of 200 or greater is particularly preferred for stable melt spinning at high temperatures. The polyhydric alcohol functions as a plasticizer for the cellulose acetate polymer.

Specific examples of polyethers with a solubility parameter exceeding 14 and at least one residue comprising glycerin include polyethers represented by the following formula where $R^1$, $R^2$ and $R^3$ may be the same or different and each represents H or —CH₃, and a, b and c are each 0 or natural numbers, satisfying the inequality $1 \leq a+b+c \leq 20$, which is obtained by dehydration reaction between a hydroxyl group of glycerin and a hydroxyl group of ethylene glycol, propylene glycol, polyethylene glycol, polypropylene glycol or a copolymer of ethylene glycol and propylene glycol, as well as polyethers which are glycerin polymers with a polymerization degree of 2–20, and mixtures thereof. Specific examples of such polyethers which are especially useful are diglycerin, glycerin and mixtures thereof. These polyethers have a microphase separation effect due to their low compatibility with cellulose acetate polymers, and are thus useful as pore-forming agents. The molecular weight of the polyether is preferably within the range specified above, since molecular weights exceeding that range result in inhibition of the plasticizing effect of the polyhydric alcohol and thus impaired ability to be made into fibers.

Also, the water-soluble polyhydric alcohol with a solubility parameter of from 10 to 14 is preferably a dihydric alcohol, and specific examples thereof include aliphatic glycols of 4 to 6 carbon atoms such as 1,4-butanediol, 1,5-pentanediol, triethylene glycol. Of these, butanediol is particularly preferred. The water-soluble polyhydric alcohol functions as a dispersing agent to improve the dispersability of the polyether in the plasticizer.

In the process described above, the amounts X, Y and Z (parts by weight) of each of the components added to 100 parts by weight of the cellulose acetate polymer are preferably within the ranges specified by the following inequalities (i-1) to (iii-1).

$$160 \leq X+Y+Z \leq 240 \quad (i\text{-}1)$$

$$10 \leq Y \leq 80 \quad (ii\text{-}1)$$

$$3 \leq Z \leq 35 \quad (iii\text{-}1)$$

Using a mixture with these mixing proportions allows stable, long-term spinning of hollow fibers of a desired shape and good roundness, by employing a publicly known melt spinning method for obtaining hollow fibers.

According to the process of the present invention, when the amount of the polyether is less than 10 parts by weight (Y<10), the melt viscosity of the mixture becomes markedly more dependent on the temperature, varying greatly with even small temperature differences, and therefore stable spinning is hampered. On the other hand, when the amount is greater than 100 parts by weight (Y>100), the plasticity of the polyhydric alcohol is weakened thus inviting fiber breakage, while the polyhydric alcohol and polyether tend to separate and be deposited on the fiber walls, thus impairing the solute-fractionating properties of the fiber after extraction.

By spinning a mixture of the cellulose acetate polymer, the polyhydric alcohol with a solubility parameter of less than 10, the polyether with a solubility parameter exceeding 14 and the polyhydric alcohol with a solubility parameter between 10 and 14, it is possible to obtain hollow fibers with the desired water-removal performance and substance permeability, but the performance depends greatly on the composition of each of the components and the nature of the hollow fiber membrane based on these components.

A low amount of polyether in the mixture results in a stronger affinity of the polyhydric alcohol to the cellulose acetate polymer, and therefore the mixture has a nearly uniform composition on the level of the cellulose acetate polymer molecules. Consequently it becomes impossible to obtain a hollow fiber membrane with the desired permeability even with extraction after melt spinning.

Furthermore, when the polyhydric alcohol used as the dispersing agent, i.e. the polyhydric alcohol with a solubility parameter of between 10 and 14 is present in an amount of less than 3 parts by weight (Z<3), the polyether has poor dispersability in the dope, making it impossible to obtain a uniform microphase separation structure and tending to result in the formation of large-sized pores, whereas conversely, when it is present in an amount exceeding 50 parts by weight (Z>50), the inside of the hollow fibers tends to be rough, resulting in a large amount of blood residue.

The solubility parameter referred to in this specification is that proposed by Hildebrand and calculated from the cohesive energy density (see J. Hildebrand & R. L. Scott, The Solubility of Non-Electrolytes, pp. 94, 121, 425 (1948)).

The melt spun hollow fibers are then subjected to extraction with a heated aqueous medium to extract and remove each of the added components (plasticizer, pore-forming agent and dispersing agent). The extraction is preferably carried out using water heated to 70°–88° C. If the temperature is lower than 70° C. then adequate performance is not exhibited, and if it exceeds 88° C. the smoothness of the inside of the hollow fibers is poor, sometimes causing problems of blood residue.

Next, at least one of either a polyhydric alcohol such as glycerin or a polyether with at least one residue comprising glycerin, which is water-soluble and harmless and has a solubility parameter exceeding 14, is attached to the hollow fibers. These are preferably added in an amount of 90 to 150 parts by weight to 100 parts by weight of the cellulose acetate polymer. If this is less than 90 parts by weight, the pores lack stable retention and thus tend to exhibit poor performance. On the other hand, if it is greater than 150 parts by weight, leaks tend to occur in the tubes during molding of the module of the blood purifying apparatus.

The present invention will now be more fully explained by way of the following examples. These examples, however, are not intended to restrict the present invention in any way. The term "parts" refers to parts by weight throughout.

EXAMPLE 1

To 100 parts of cellulose diacetate with an average polymerization degree of 260 and an acetylation degree of 54%, there was added and mixed therewith 210 parts of an additive prepared by mixing 76% of polyethylene glycol with a molecular weight of 400 (solubility parameter: 8.6), 17% of diglycerin (solubility parameter: 15) and 7% of 1,4-butanediol (solubility parameter: 13), in terms of weight ratios. The mixture was melted at 180°–200° C., and spinning was performed using a nozzle for hollow fibers with a double toric slit, introducing nitrogen gas into the hollow.

Next, the additive was extracted with water heated to 84° C., and after addition of glycerin (solubility parameter: 17.1) to the hollow fibers in an amount of 120 PHR (120 parts to 100 parts of the polymer) and drying, the fibers were collected into bundles to assemble a blood purifying apparatus with a membrane area of about 1.5 m². The inner diameter of the hollow fibers was 197 μm, and the membrane thickness was 13.0 μm.

During the process the inner surface of the hollow fibers and a cross-section perpendicular to the axis of the fibers (hereunder, "cross-section") were observed using a high-resolution SEM (model S-900, product of Hitachi Seisakusho). The photographs are shown in FIGS. 1–5.

The inner surface of the resultant hollow fibers was substantially flat and the arrangement of the cellulose diacetate polymer particles on the inner surface was substantially non-oriented (see FIG. 1), while there was a thin dense layer with a thickness of about 50 nm on both the innermost and outermost portion of the membrane as viewed by a cross-section of the hollow fibers, and the area between the innermost portion to the outermost portion had a substantially uniform porous structure (see FIGS. 2–5).

The performance of this blood purifying apparatus is shown in Table 1.

Here, the blood plasma albumin permeation blockage was calculated according to the following formula using human blood plasma (obtained from Wako Junyaku, KK. through the Japan Biomaterials Center). The circulation volume of the blood plasma at the time was 200 ml/min, the filtrate was also sent back to the initial solution, the temperature of the initial solution was 37° C., and the ECUM method (measuring by ultrafiltration alone without using dialyzing fluid) was performed after 2 hours of circulation with the differential pressure set for a filtrate flow rate of 10 ml/min at the start.

$$\text{Permeation blockage} = \frac{\text{filtrate albumin conc.}}{\text{initial albumin conc.}} \times 100(\%)$$

Also, the in vivo $\beta_2$-MG sieving coefficient was calculated according to the formula:

$$\text{Sieving coefficient}(SC) = \frac{\text{filtrate } \beta_2\text{-}MG \text{ conc.}}{\text{blood } \beta_2\text{-}MG \text{ conc. prior to entering blood purifier}}$$

The $\beta_2$-MG sieving coefficient was measured in a clinical dialysis test by the ECUM method for 1 hour after the start of dialysis, with a blood flow rate of 200 ml/min.

The ultrafiltration rate (UFR) referred to here is the amount of eliminated water per unit area ($m^2$) obtained per unit of time (one hour) per unit of pressure (mmHg) (ml/$m^2 \cdot$mmHg$\cdot$hr), the in vivo UFR is the value actually measured after the course of one hour from the start of dialysis in a clinical dialysis test, and the in-vitro UFR is the value measured using distilled water.

The degree of blood residue was evaluated by visually examining the blood remaining in the hollow fiber section of the blood purifying apparatus after reinfusion upon completion of the clinical dialysis.

TABLE 1

| UFR | | | Plasma albumin permeation blockage | $\beta_2$-MG sieving coefficient (in-vivo) | Blood residue (in-vivo) |
|---|---|---|---|---|---|
| in-vitro | in-vivo | in-vivo/ in-vitro | | | |
| 34 | 17 | 0.5 | 95% | 0.48 | good |

EXAMPLE 2

To 100 parts of cellulose diacetate with an average polymerization degree of 260 and an acetylation degree of 54%, there was added 200 parts of an additive prepared by mixing 75% of polyethylene glycol with a molecular weight of 400, 20% of diglycerin and 5% of 1,4-butanediol in terms of weight ratios, the components were mixed and melted in an extruder at 180°–215° C., and the mixture was spun by discharge through a nozzle for hollow fibers with a double toric slit while introducing nitrogen gas into the hollow.

Next, the additive was extracted with water heated to 84° C., and after addition of glycerin to the hollow fibers in an amount of about 120 PHR and drying, the fibers were bundled to assemble a blood purifying apparatus with a membrane area of about 1.5 $m^2$. The inner diameter of the hollow fibers was about 200 $\mu$m, and the membrane thickness was 13.5 $\mu$m.

A view of the inner surface and cross-section of the resultant hollow fibers showed a flat inner surface roughly the same as seen in the photograph in Example 1, a cross-section with a thin dense layer having a thickness of about 50 nm on the innermost and outermost portions, and a substantially uniform porous section between them.

The performance of this blood purifying apparatus is shown in Table 2.

TABLE 2

| UFR | | | Plasma albumin permeation blockage | $\beta_2$-MG sieving coefficient (in-vivo) | Blood residue (in-vivo) |
|---|---|---|---|---|---|
| in-vitro | in-vivo | in-vivo/ in-vitro | | | |
| 40 | 19 | 0.48 | 94.5% | 0.45 | good |

EXAMPLE 3

To 100 parts of cellulose diacetate with an average polymerization degree of 260 and an acetylation degree of 54%, there was added 208 parts of an additive prepared by mixing 73% of polyethylene glycol with a molecular weight of 400, 5% of diglycerin, 15% of glycerin and 7% of 1,4-butanediol in terms of weight ratios, the components were mixed and melted in an extruder at a temperature of 180°–215° C., and the mixture was spun by discharge through a nozzle for hollow fibers with a double toric slit while introducing nitrogen gas into the hollow.

Next, the additive was extracted with water heated to 84° C., and after addition of glycerin to the hollow fibers in an amount of about 130 PHR and drying, the fibers were bundled to assemble a blood purifying apparatus with a membrane area of about 1.5 $m^2$. The inner diameter of the hollow fibers was about 195 $\mu$m, and the membrane thickness was 13.5 $\mu$m.

The performance of this blood purifying apparatus is shown in Table 3.

TABLE 3

| UFR | | | Plasma albumin permeation blockage | $\beta_2$-MG sieving coefficient (in-vivo) | $K_0$ (urea) (in-vitro) | Blood residue (in-vivo) |
|---|---|---|---|---|---|---|
| in-vitro | in-vivo | in-vivo/ in-vitro | | | | |
| 42 | 19 | 0.45 | 96.5% | 0.47 | 0.052 (cm/min) | good |

EXAMPLE 4

To 100 parts of cellulose diacetate with an average polymerization degree of 260 and an acetylation degree of 55.2%, there was added 208 parts of an additive prepared by mixing 72% of polyethylene glycol with a molecular weight of 400, 5% of diglycerin, 13% of glycerin and 10% of 1,4-butanediol in terms of weight ratios, the components were mixed and melted in an extruder at 180°–215° C., and the mixture was spun by discharge through a nozzle for hollow fibers with a double toric slit while introducing nitrogen gas into the hollow.

Next, the additive was extracted with water heated to 84° C., and after addition of glycerin to the hollow fibers in an amount of about 130 PHR and drying, the fibers were bundled to assemble a blood purifying apparatus with a membrane area of about 1.5 $m^2$. The inner diameter of the hollow fibers was about 198 $\mu$m, and the membrane thickness was 13.5 $\mu$m.

The performance of this blood purifying apparatus is shown in Table 4.

TABLE 4

| UFR | | | Plasma albumin permeation blockage | $\beta_2$-MG sieving coefficient (in-vivo) | $K_0$ (urea) (in-vitro) | Blood residue (in-vivo) |
|---|---|---|---|---|---|---|
| in-vitro | in-vivo | in-vivo/ in-vitro | | | | |
| 43.6 | 19 | 0.44 | 95.5% | 0.49 | 0.056 (cm/min) | good |

EXAMPLE 5

To 100 parts of cellulose diacetate with an average polymerization degree of 170 and an acetylation degree of 54.8%, there was added 160 parts of an additive prepared by mixing 78% of polyethylene glycol with a molecular weight of 400, 13% of diglycerin and 9% of 1,4-butanediol in terms of weight ratios, and spinning was performed by the same procedure as in Example 1 to obtain hollow fibers.

The hollow fibers were also treated with water heated to 80° C. to extract the additive, and glycerin was added in an amount of 95 PHR. The fibers were then bundled in groups of about 11,500 to assemble a blood purifying apparatus with a membrane area of about 1.5 m².

The performance of this blood purifying apparatus is shown in Table 5.

TABLE 5

| UFR | | | Blood residue |
|---|---|---|---|
| in-vitro | in-vivo | in-vivo/in-vitro | (in-vivo) |
| 12.0 | 10.0 | 0.83 | good |

COMPARATIVE EXAMPLE 1

To 100 parts of cellulose diacetate with an average polymerization degree of 260 and an acetylation degree of 54%, there was added 210 parts of an additive prepared by mixing 50% of polyethylene glycol with a molecular weight of 400, 25% of diglycerin and 25% of 1,4-butanediol in terms of weight ratios, spinning was performed by the same procedure as in Example 1, and then the additive was extracted with water heated to 90° C., glycerin was added, and the fibers were dried and bundled to assemble a blood purifying apparatus with a membrane area of about 1.5 m². The glycerin attached in an amount of 145 PHR. The inner diameter of the hollow fibers was 205 μm, and the membrane thickness was 12.5 μm.

Figure 1:
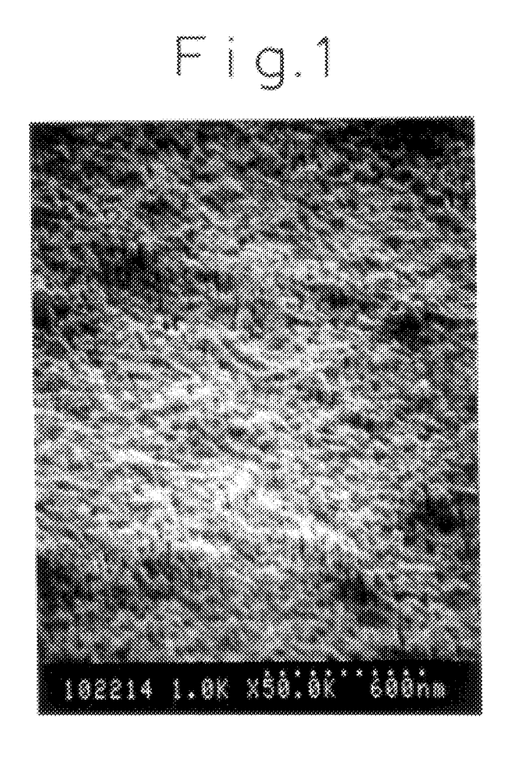
FIG. 1 is an illustrative high-resolution scanning electron microscope (SEM) photograph (50,000×) of the inner surface of a hollow fiber to be used in a blood purifying membrane according to the invention.
Figure 2:
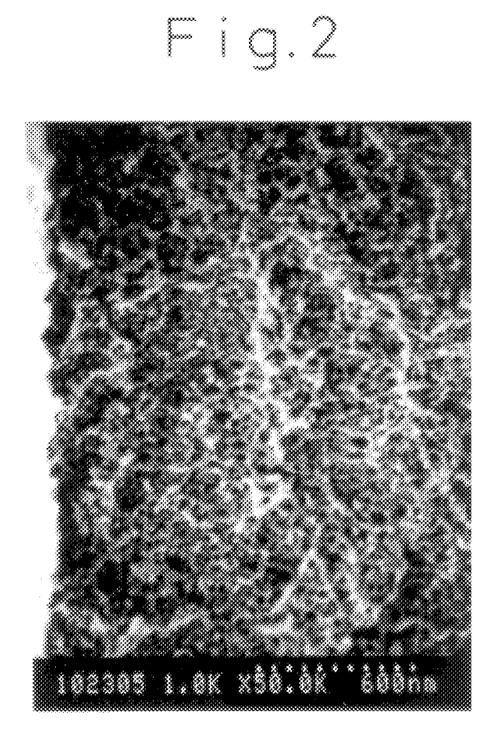
FIG. 2 is an illustrative high-resolution SEM photograph (50,000×) of the innermost layer of a cross-section of a hollow fiber to be used in a blood purifying membrane according to the invention, with the dense layer of the inner surface shown on the left end.
Figure 3:
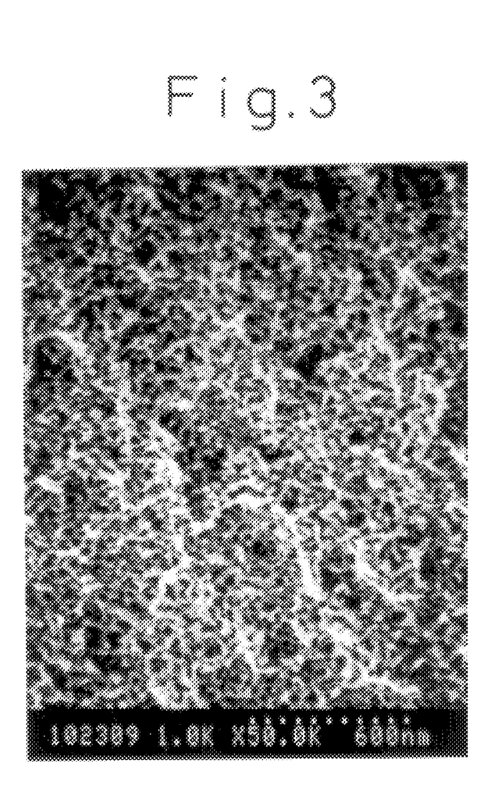
FIG. 3 is an illustrative high-resolution SEM photograph (50,000×) of the section between the wall membranes of a cross-section of a hollow fiber to be used in a blood purifying membrane according to the invention.
Figure 4:
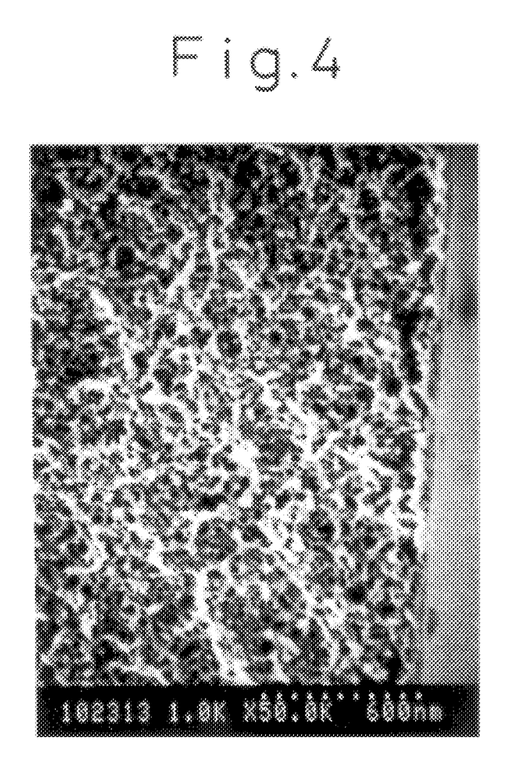
FIG. 4 is an illustrative high-resolution SEM photograph (50,000×) of the outermost layer of a cross-section of a hollow fiber to be used in a blood purifying membrane according to the invention, with the dense layer of the outer surface shown on the right end.
Figure 5:
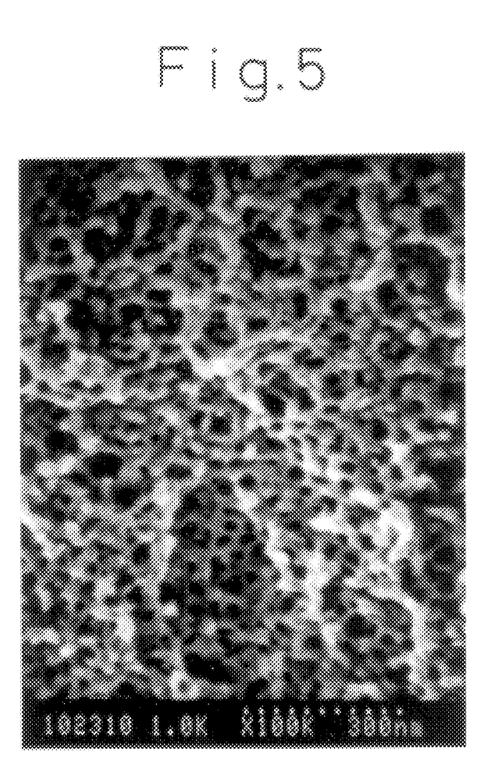
FIG. 5 is an illustrative high-resolution SEM photograph (10,000×) of the section between the wall membranes of a cross-section of a hollow fiber to be used in a blood purifying membrane according to the invention.
Figure 6:
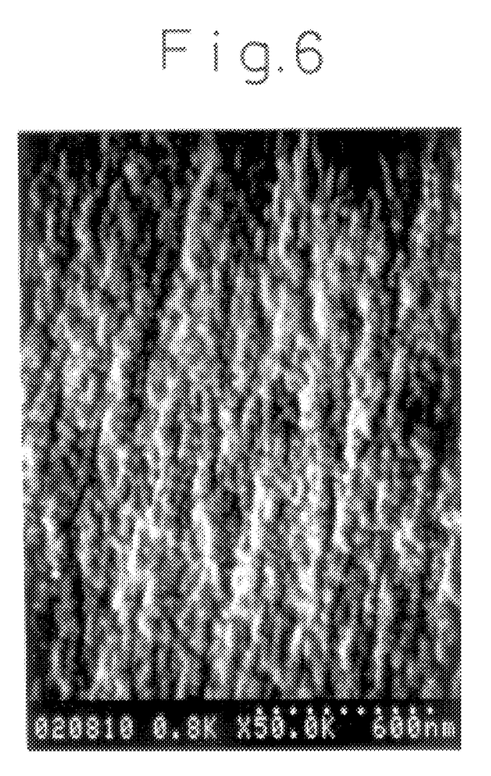
FIG. 6 is an illustrative high-resolution SEM photograph (50,000×) of the inner surface of a hollow fiber according to Comparative Example 1.
Figure 7:
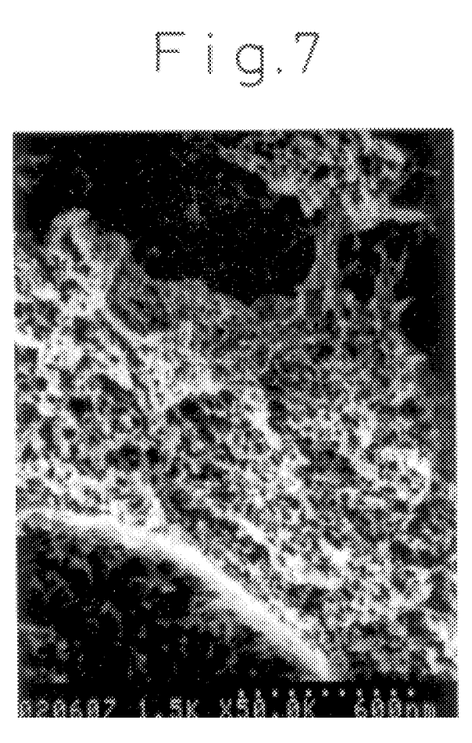
FIG. 7 is an illustrative high-resolution SEM photograph (50,000×) of the section between the wall membranes of a cross-section of a hollow fiber according to Comparative Example 1.

The inner surface and cross-section were observed with a high-resolution SEM as in Example 1. The inner surface had a large irregular streak along the direction of the fiber axis (see FIG. 6), and observation of the cross-section (see FIG. 7) revealed considerable variation in the pore system. In the in-vivo evaluation, the blood residue was judged to be very poor.

The performance of this blood purifying apparatus is shown in Table 6.

The in-vivo/in-vitro UFO ratio was very small, clogging occurred in the in-vivo evaluation and the plasma albumin permeation blockage was also low, showing that the desired type of membrane had not been obtained.

TABLE 6

| UFR | | | Plasma albumin permeation blockage | $\beta_2$-MG sieving coefficient (in-vivo) | Blood residue (in-vivo) |
|---|---|---|---|---|---|
| in-vitro | in-vivo | in-vivo/ in-vitro | | | |
| 67 | 17 | 0.25 | 88% | 0.5 | poor |

COMPARATIVE EXAMPLE 2

To 100 parts of cellulose diacetate with an average polymerization degree of 170 and an acetylation degree of 54.8%, there was added 150 parts of an additive prepared by mixing 87.5% of polyethylene glycol with a molecular weight of 400 and 12.5% of diglycerin in terms of weight ratios, and spinning was performed by the same procedure as in Example 1 to obtain hollow fibers. The hollow fibers were also treated with water heated to 70° C. to extract the additive, and glycerin was added. The glycerin attached in an amount of 89 PHR.

The fibers were then collected in bundles to assemble a blood purifying apparatus with a membrane area of about 1.5 m².

Figure 8:
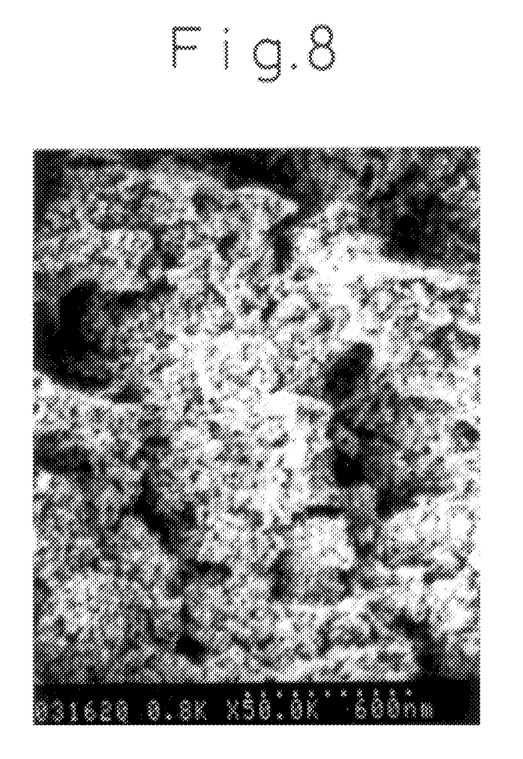
FIG. 8 is an illustrative high-resolution SEM photograph (50,000×) of the section between the wall membranes of a cross-section of a hollow fiber according to Comparative Example 2.

When the cross-section was observed by high-resolution SEM in the same manner as in Example 1 (see FIG. 8), it was found that the polymer had aggregated too densely and the proper porosity had not been achieved. In addition, the actual measured value of the $\beta_2$-MG sieving coefficient of the membrane was very small at 0.15, showing that the desired performance could not be obtained.

INDUSTRIAL APPLICABILITY

The present invention provides a cellulose acetate-based hollow fiber blood purifying membrane which undergoes little change in separation performance with time when used for blood purification procedures and which has excellent separation properties, and it may thus be used with advantages in the medical industry.

We claim:

1. A hollow fiber blood purifying membrane having an inner and outer surface comprising cellulose acetate, and having a substantially non-oriented distribution of cellulose acetate polymer particles on the inner surface of the hollow fibers, said fibers comprising a dense layer with a thickness in the range of 30 to 1000 nm on both the inner and outer surface portions of said hollow fibers and a porous structure which is substantially uniform between the two dense layers, and having an in vitro ultrafiltration rate (UFR) of 10 to 50 ml/m²·mmHg·hr and an (in vivo UFR)/(in vitro UFR) ratio of at least 0.3, a blood plasma albumin permeation blockage of at least 90%, and an in vivo $\beta_2$-microglobulin ($\beta_2$-MG) sieving coefficient of at least 0.4.

2. A membrane according to claim 1, wherein the inner surface of said hollow fibers is substantially flat.

3. A membrane according to claim 1, wherein said in-vitro ultrafiltration rate (UFR) is between 15 and 35 ml/m²·mmHg·hr.

4. A membrane according to claim 1, wherein said (in vivo UFR)/(in vitro UFR) ratio is at least 0.35.

5. A membrane according to claim 1, wherein said blood plasma albumin permeation blockage is at least 93%.

6. A membrane according to claim 1, wherein the acetylation degree of said cellulose acetate is 50–58%, and the polymerization degree is 160 to 400.

7. A process for producing a hollow fiber blood purifying membrane according to claim 1, wherein a mixture containing, with respect to 100 parts by weight of a cellulose acetate polymer, at least one water-soluble polyhydric alcohol with a thermoplasticizing effect on the cellulose acetate polymer and a solubility parameter of less than 10 (x parts by weight), at least one water-soluble polyether with a solubility parameter exceeding 14 and at least one residue comprising glycerin (Y parts by weight), and at least one water-soluble polyhydric alcohol with a solubility parameter in the range of 10 to 14 (z parts by weight), in the ranges specified by the following inequalities (i)–(iii), $$120 \leq X+Y+Z \leq 250 \quad (i)$$

$$10 \leq Y \leq 100 \quad (ii)$$

$$3 \leq Z \leq 50 \quad (iii)$$

is melt spun into hollow fibers, after which the obtained hollow fibers are subjected to extraction with a heated aqueous medium, and at least one of either a polyether with at least one residue comprising glycerin or a polyhydric alcohol, which is water-soluble and harmless and has a solubility parameter exceeding 14, is attached thereto.

8. The process according to claim 7, wherein the amounts X, Y and X of the components of the additive with respect to 100 parts by weight of the cellulose acetate polymer are in the ranges specified by the following inequalities (i-1) to (iii-1)

$$160 \leq X+Y+Z \leq 240 \qquad (i\text{-}1)$$

$$10 \leq Y \leq 80 \qquad (ii\text{-}1)$$

$$3 \leq Z \leq 35 \qquad (iii\text{-}1).$$

9. The process according to claim 7, wherein said water-soluble polyhydric alcohol with a solubility parameter in the range of 10 to 14 is an aliphatic glycol of 4 to 6 carbon atoms.

10. The process according to claim 7, wherein said water-soluble polyhydric alcohol with a solubility parameter of less than 10 is a water-soluble polyhydric alcohol with a molecular weight of at least 200.

11. The process according to claim 7, wherein said water-soluble polyether is a polyether represented by the following formula where $R^1$, $R^2$ and $R^3$ may be the same or different and each represents H or —$CH_3$, and a, b and c are each 0 or natural numbers, satisfying the inequality $1 \leq a+b+c \leq 20$, a polyether which is a glycerin polymer with a polymerization degree of 2 to 20, or a mixture thereof.

12. The process according to claim 7, wherein said heated aqueous medium is water heated to 70°–88° C.

13. The process according to claim 7, wherein the acetylation degree of said cellulose acetate is 50–58%, and the polymerization degree is 160 to 400.

* * * * *